INVENTORS
MICHAEL THORN
WILLIAM GEMMELL BRACKENBRIDGE

BY Cullen, Sloman, & Cantor
ATTORNEYS

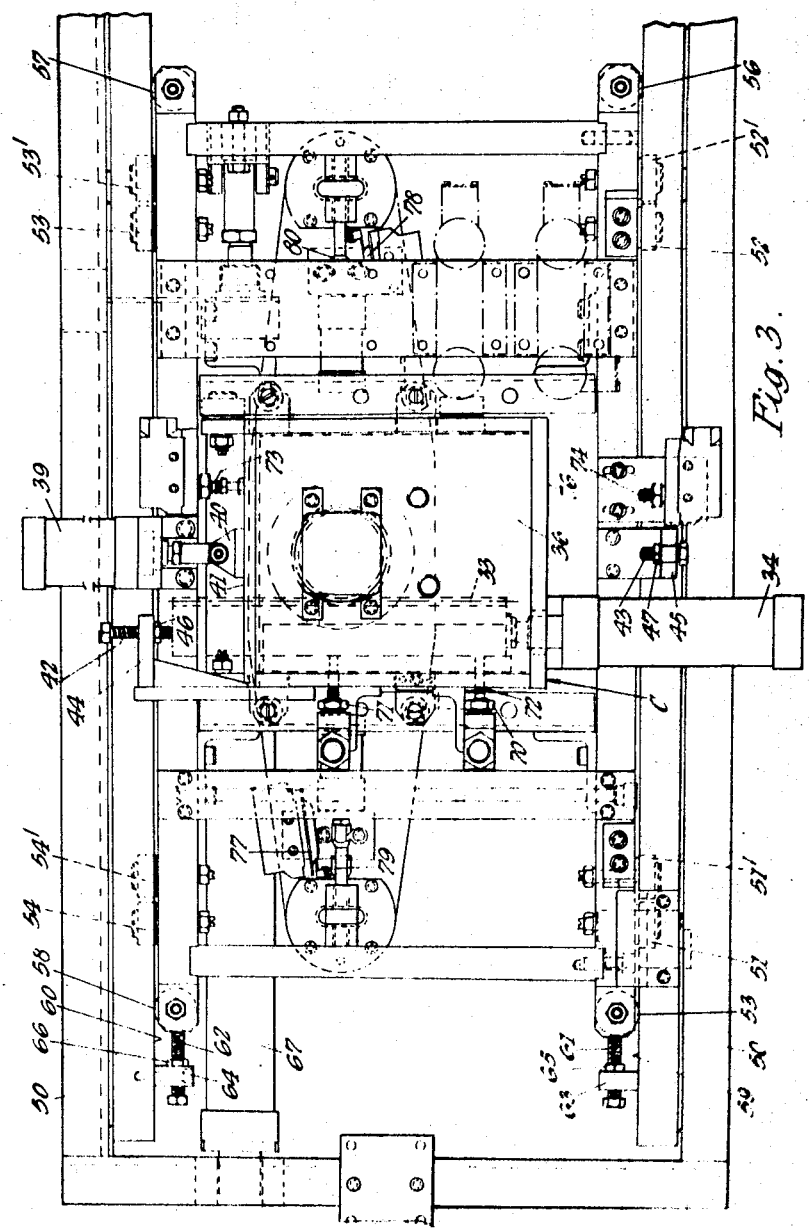

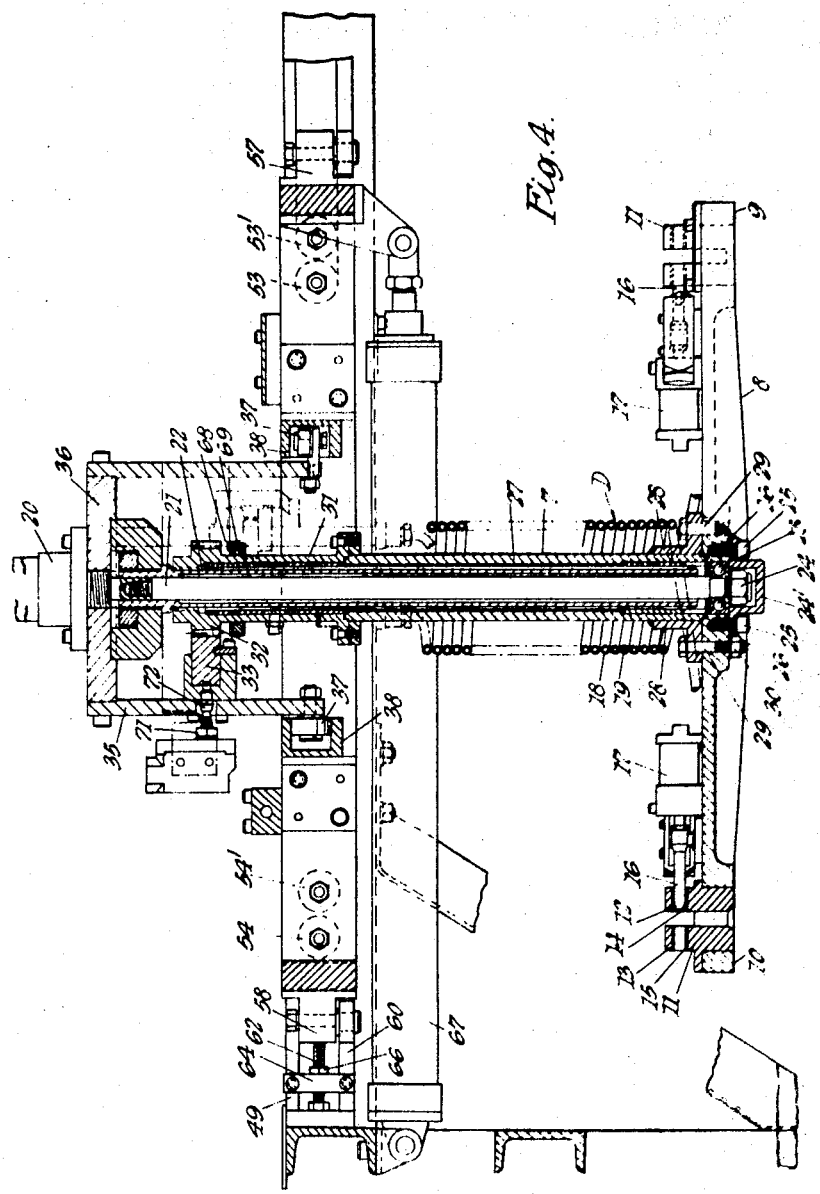

United States Patent Office

3,566,441
Patented Mar. 2, 1971

3,566,441
INJECTION/BLOW MOULDING MACHINE
Michael Thorn and William Gemmell Brackenbridge, Kingston-on-Thames, England, assignors to Blewis & Shaw (Plastics) Limited, Kingston upon Thames, England
Continuation of application Ser. No. 577,456, Sept. 6, 1966. This application June 4, 1969, Ser. No. 830,321
Claims priority, application Great Britain, May 26, 1966, 23,644/66
Int. Cl. B29d 23/03
U.S. Cl. 18—5
9 Claims

ABSTRACT OF THE DISCLOSURE

The disclosure relates to an injection/blow moulding machine in which the parison stick transfer mechanism can be connected to and disconnected from the parison sticks employed in the moulds of the machine. The transfer mechanism is arranged so that a typical sequence of operations in respect of an injection mould and a pair of blow moulds served by the injection mould, is as follows: (1) the parison sticks respectively of one of the blow moulds and the injection mould are connected to the transfer mechanism, (2) after that blow mould and the injection mould have opened, simultaneously, the parison stick of the latter is transferred to the blow mould and the parison stick of the blow mould is transferred to the injection mould (i.e., after stripping off of the blown article), (3) the parison sticks of the blow mould concerned and the injection mould are disconnected, after the moulds have closed, from the transfer mechanism, and (4) the transfer mechanism then assumes a position to carry out a like transfer between the injection mould and the other of the two blow moulds.

---

This is a continuation of Ser. No. 577,456 filed Sept. 6, 1966 and now abandoned.

The present invention relates to an injection/blow moulding machine and to a transfer mechanism of such machine.

Injection/blow moulding machines are well known which produce a moulded plastic article by first forming a parison or pre-form on a so-called parison stick in an injection mould and then forming the article from the parison by blowing out the parison to the shape of the article in a separate blow mould. In such machines, it is necessary to provide a means of transferring the parison stick between an injection mould and a blow mould.

In producing articles by injection and blow moulding, it is often the case that the injection moulding of the parison can be effected more quickly than the blow moulding of the parison to the article, i.e., the ratio, known as the moulding ratio, of the duration of the blow moulding to the duration of the injection moulding, is greater than 1:1. In some cases, the moulding ratio may be as great as 3:1 or even greater.

In instances where the moulding ratio is greater than 1:1, it follows that if an injection mould serves only one blow mould, the injection mould will be unemployed at least for a time equal to the difference between the blow moulding time and the injection moulding time, for each article produced. This time which for convenience may be referred to as the waiting period, represents lost production time and in order to reduce or eliminate the waiting period machines have been developed which employ a plurality of blow moulds to serve the or each injection mould.

In the machines developed heretofore, however, the means designed for the machine for transferring the parison sticks gave rise to underemployment of the blow moulds; at least one blow mould being left unused during an entire injection moulding period. In other words, underemployment of the injection mould was avoided only by incurring underemployment of the blow moulds.

It is an object of the present invention to provide in an injection/blow moulding machine using a plurality of blow moulds for the or for each injection mould (hereinafter referred to as a machine of the kind defined), a transfer mechanism which will lead not only to a reduction or the elimination of the waiting period but which will also lead to a fuller utilisation of all of the blow moulds served by any one injection mould.

It may here be explained that the word "mould" employed above and hereafter in this specification, is used in a general sense to mean a mould assembly having either one or a plurality of moulding cavities.

Each mould may provide a plurality of moulding cavities each to receive a parison stick in which case the transfer mechanism is such as to connect with all the parison sticks of any mould simultaneously so as to transfer them together, and to disconnect from them simultaneously on completion of the transfer.

The parison sticks of any mould may be carried in a holder to which the sticks remain attached so that each parison-stick transporting member need only engage and disengage the holder rather than the parison sticks themselves.

The moulds employed in a machine of the invention may be two part moulds preferably of the type in which one part is a fixed part and the other part a movable part in which case the transfer mechanism should be such that the parison-stick transporting member or each of them is able to undergo a horizontal movement to place the parison sticks in or remove them from the position occupied during moulding so that when a mould is opened, a parison stick may be moved clear of the fixed plate thereof prior to removing the stick from between the mould plates of an open mould, the stick may be replaced in the position occupied during moulding to enable the mould to be closed.

An advantage of the present invention is that the order in which the blow moulds are served by the injection mould is not determined by the spatial arrangement of the blow moulds in relation to the injection mould viz: the transfer mechanism can be arranged to effect transfers to and from the blow moulds in the order determined by the most efficient utilisation of the moulds.

In this way, as many blow moulds can be fully utilised as are required by the moulding ratio and the waiting period that would otherwise be incurred is substantially reduced or, when the moulding ratio is an integral ratio (i.e., 2:1; 3:1; 4:1, etc.), substantially eliminated.

It will be understood, therefore, that a machine of the present invention may use more than two blow moulds with the injection mould depending upon the moulding ratio.

The invention will now be described, by way of example only, with reference to the accompanying drawing, in which:

FIG. 3 is a part plan view from above of the transfer mechanism; and

FIG. 4 is a sectional elevational (end-on in respect of the machine itself) of part of the transfer mechanism.

The machine illustrated in FIGS. 1 to 4 is generally conventional apart from the transfer mechanism and in view of this the machine otherwise will be described only to the extent necessary clearly to illustrate the nature of the parison-stick transfers between the moulds.

The moulds are two-part moulds of the type having a fixed part and a movable part and consist of two blow moulds 1, 2 and an injection mould 3 set in alignment transversely of the machine with the injection mould placed equidistant between the two blow moulds. Each mould receives two parison sticks fixed in a holder (two of which 4, 5 are seen in FIG. 1) and each holder provides an upstanding shank 6 by which the holder is engaged with the transfer mechanism; the shank for this purpose carrying a transverse bore (not shown).

Figure 1:
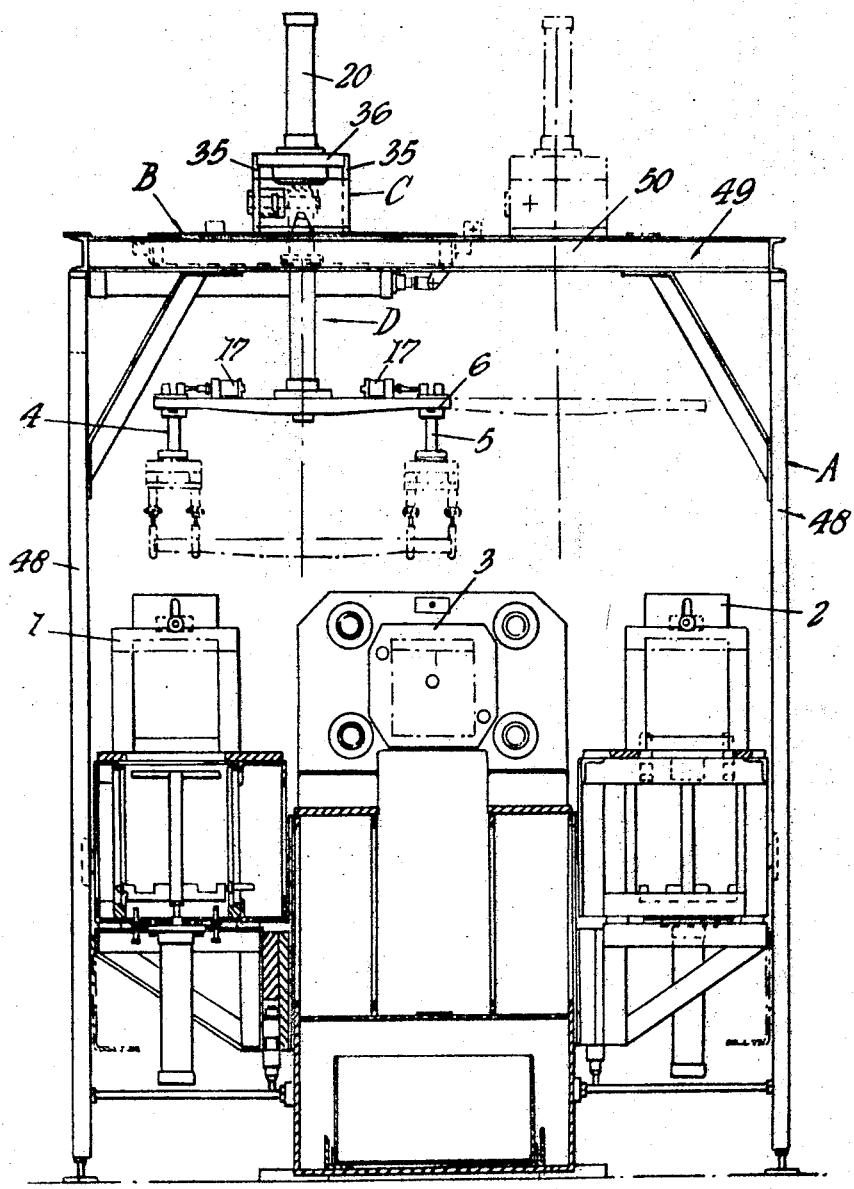
FIG. 1 is a cross-section of an injection/blow moulding machine according to the present invention.
Figure 2:
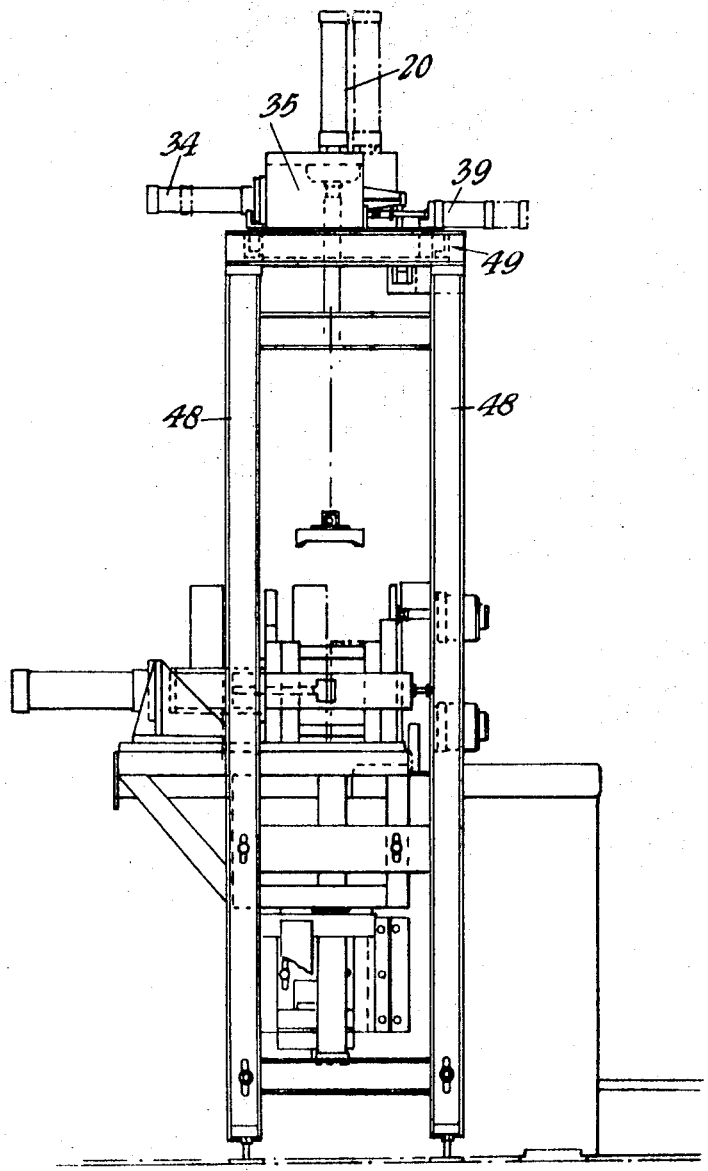
FIG. 2 is a side-on elevation at the part of the machine at which the transfer mechanism is located.

The transfer mechanism generally consists of the following parts:

(1) a bearing means generally indicated at D and best seen in FIG. 4, bearing two parison sticks transporting members, (2) carriage means for carrying said bearing means and comprising: a main carriage generally indicated at B and a subsidiary carriage generally indicated at C, (3) a support structure in the form of a bridge generally indicated at A extending across the machine above the moulds thereof and best seen in FIGS. 1 and 2, together with operating means for effecting a sequence of operations of the transfer mechanism to undertake a parison stick transfer.

The bearing means D comprise a depending, rotatable, telescopic arm 7 bearing at the lower extremity thereof a horizontal beam 8 which provides identical, opposed limbs 9, 10 respectively constituting two parison sticks transporting members as will appear below. Each of the two limbs carries identical means for engaging and disengaging a parison-stick holder and since the two means are identical, only one will be described. The means comprises a locating socket 11 carried vertically in the limb near the outer extremity thereof so as to be able to receive the upstanding shank of a parison stick holder with a close sliding fit. The locating socket is transversely bored to provide two bores 12, 13 lying in alignment with the transverse bore of the shank 6 when the latter is fully received in the socket. The two bores carry bearing sleeves 14, 15 respectively to receive a bolt 16 by means of which bolt the shank of a parison stick holder may be locked in position in the socket. The bolt is operated by a pneumatic piston and cylinder device 17 fed with compressed air through a flexible tubing 18 or 19 coiled round arm 7 so that when the shank is to be locked in position in the socket, the bolt is pushed toward the outer extremity of the limb to pass through the transverse bore of the shank and enter the bore 13 and so that when the shank is to be released from the socket, the bolt is retracted clear of the bore 13 and the transverse bore of the shank 6.

The arm 7 is provided with means for raising and lowering of the beam 8 and means for rotating the latter through 180° in each direction i.e. anticlockwise and then clockwise as looked at from below.

The raising and lowering is effected by a pneumatic piston and cylinder device 20 acting on a shaft 21 to move it up or down in a fixed sleeve 22. The shaft carries near its lower end a ball bearing 23 secured thereon by a nut 24 engaged with a threaded end of the shaft. The beam 8 is mounted on the ball bearing by means of a through bore at its centre and on its underside carries an end cap 24' for nut 24, held to the beam by screws 25 received in threaded blind bores 26 in the beam.

The rotation mechanism comprises a cylindrical casing 27 surrounding sleeve 22. The sleeve 22 is externally splined to co-act with internal splines on the casing 27; the co-acting splines disengaging when the arm is in its telescoped condition and the casing is in its topmost position. The casing is attached to the beam by circular bush 28 which is welded to the casing and to which the beam is secured by bolts 29 and locking nuts 30. The casing is able to slide up and down about the sleeve 22 so as to move with the beam. The casing is also free to rotate about the sleeve when the casing is in its topmost position and the co-acting splines are disengaged, and the casing carries as an extension thereof a hollow gear shaft 31 providing an external circumferential toothed gear 32 which when the arm 7 is in its telescoped condition meshes with a rack 33. The rack is operated by a double-acting pneumatic piston and cylinder device 34 which positively drives the rack in both the forward direction (i.e. away from the cylinder of the device 34) and the reverse direction (i.e. towards the cylinder of the device 34) to cause it to rotate the beam 8 through the gear 32, shaft 31 and casing 27 in anticlockwise direction and clockwise direction respectively when the beam is looked at from below. It may be seen from the above that when the beam 8 is lowered, the gear 32 drops with the casing 27 and thus that rotation of the beam is impossible when the beam is in its lowered condition. The rack 33 with its piston and cylinder device 34, and the telescopic arm 7 together with its piston and cylinder device 20, are carried by the subsidiary carriage C which comprises upstanding wall sections 35 supporting a top section 36 on which piston and cylinder device 20 is mounted. The subsidiary carriage is mounted on rollers 37 running in channel sections 38 forming part of the main carriage and lying in a direction transverse to the direction of travel of the main carriage. Movement of the subsidiary carriage to and fro in this transverse direction is effected by a double-acting piston and cylinder device 39 the piston of which is connected to a lug 40 secured to a cross-member 41 of the subsidiary carriage. Stops are provided to terminate the transverse movement of the subsidiary carriage in each direction of movement; the stops taking the form of screws 42, 43 carried in brackets 44, 45 respectively, secured to parts of the main carriage B. The screws are provided with locking nuts 46, 47 respectively by which the position of the screws can be adjusted.

The supporting structure A on which the moving parts of the transfer mechanism are carried, comprises uprights 48 on each side of the machine supporting a rectangular, channel-section, framework 49. This framework spans the width of the machine and its lateral members 50 act as a track for the main carriage B.

The main carriage B comprises a channel-section framework mounted on rollers running in the channels of lateral members 50 and arranged in four pairs 51, 51'; 52, 52'; 53, 53'; and 54, 54'. The rollers are mounted on horizontal axes and located towards each end on each side of the main carriage. The main carriage also has mounted thereon guide rollers 55, 56, 57 and 58 to prevent lateral shift of that carriage; the guide rollers acting against a surface of upstanding flanges 59, 60 integral with respective lateral members 50.

The limits of travel of the main carriage are chosen by four screw stops one at each end and at each side of the framework 49. The screw stops are identical and two 61, 62 are seen in FIG. 3. Each consists of a screw passed through a threaded bore of a lug as seen at 63 or 64 secured to a lateral member 50, so as to oppose the ends of the main carriage carrying the guide rollers and each carries a locking nut as seen at 65 or 66 by which the position of the stop may be adjusted.

The main carriage B is moved by means of a double-acting pneumatic piston and cylinder device 67 anchored at the closed end of the cylinder to an end member of framework 49 and pivotally attached at the end of the piston rod remote from the cylinder to a side member of the frame of the main carriage.

The limits of travel of the main carriage are crosen so that at either extremity, the beam 8 is at each one or the other of the two stations in which the sockets of the limbs of the beam are aligned with the shanks 6 of a parison stick holder respectively of the injection mould and one of the blow moulds.

The pneumatic system of the machine is controlled by valves so that each following movement in the sequence effected by the transfer mechanism is initiated at the termination of the preceding movement, and for this purpose the machine is provided with cam-operated electrical limit switches and cam strikers therefor disposed on relatively moving parts so that actuation of the switch takes place at the termination of the relative movement between the parts to initiate the next following movement in the sequence. Thus, there are provided a cam-operated limit switch 68 located adjacent the upper end of the arm 7 to be struck by a cam striker 69 in the form of a collar mounted externally on gear shaft 31; cam-operated limit switches 70, 71 located on the subsidiary carriage C to be struck by a cam striker 72 carried on the rack 33, at the termination respectively of the forward and reverse movements of the rack; cam-operated limit switches 73, 74 to be struck respectively by a cam striker 75 and an end 76 of the subsidiary carriage at the termination of the respective transverse movements thereof; and cam-operated limit switches 77, 78 to be struck respectively by cam strikers 79, 80 carried on the bolts of limbs 9, 10 of the beam 8.

In operation of the machine, a transfer of parison sticks between one or other of the two blow moulds and the injection mould takes place by the sequence of operations as follows; the assumption being made that at the start of the sequence the arm 7 is in its raised position and located to leave the beam 8 in one or the other of the two stations above mentioned:

(1) the arm 7 is extended to lower the beam 8 and cause the sockets 11 to pass around the shanks 6 of the respective parison-stick holders and the bolts 16 are then actuated to lock the shanks in the sockets;

(2) the moulds are then opened and the subsidiary carriage is moved transversely to clear the parison sticks from the fixed plates of the moulds following which finished articles formed in the blow mould, are stripped from the parison sticks;

(3) the arm 7 is then raised and the beam 8 rotated through 180° to reverse the positions of the parison sticks i.e. those from the injection mould are positioned above the blow mould concerned and those from that blow mould are positioned above the injection mould;

(4) the arm 7 is again extended to place the parison sticks between the mould plates and the subsidiary carriage is reversed to position the parison sticks in the position occupied during moulding;

(5) the moulds are then closed, the bolts 16 retracted and the arm 7 raised;

(6) the main carriage is then moved to the other extremity of its travel to position the beam at the other of its two stations and thus leave the transfer mechanism ready to undertake a fresh sequence of movements in respect of the other blow mould.

It will be understood that following opening of a blow mould any articles formed therein are stripped from the parison sticks before the sticks are transferred. Any convenient means may be employed for this purpose.

It follows from the above manner operation that in the cause of a moulding ratio of 2:1 the blow moulding operations alternately will terminate at substantially the same time as an injection moulding operation so that the only time during which the moulds are not actually in use is the period taken to open the moulds, strip-off the finished articles from the blow mould parison sticks and effect the transfer of the parison sticks as above described. However, even in cases where the moulding ratio is less than 2:1 say an injection cycle of 15 seconds and a blow-moulding cycle of 20 seconds, the machine still allows a transfer to be affected from one blow mould while the other is being used for blowing an article and the machine, therefore, in these cases still provides the advantage of utilising the moulds to the maximum extent possible. Typically a transfer period of the machine is 6 seconds.

The full electrical circuitry of the pneumatic control system of the machine has not been described above since it is not part of the invention per se and since a skilled person could readily devise such circuitry.

Further, it is not essential in the present invention to use a pneumatic motive power system and that any other suitable system may be used e.g. a hydraulic system.

It will also be understood that the present invention need not use stationary blow moulds although generally it is advantageous to do so and that a plurality of injection moulds also may be employed each with its own set of blow moulds and a transfer mechanism. The moulds need not be arranged in any particular spatial configuration and the parison-stick transporting members may be arranged to run on tracks underlying the moulds so that vertical movement to clear the moulds is avoided. Such an arrangement is particularly suitable where the moulds are set in alignment in the same horizontal plane.

In another embodiment of the invention, a plurality of blow moulds are set around an injection mould and the transfer mechanism provides a plurality of parison-stick transporting members for transfer of parison sticks between the injection mould and each of the blow moulds respectively so that when a transfer has been completed between an injection mould and a blow mould, the member effecting the transfer is left clear of the injection mould to make way for the or another member to effect a transfer between the injection mould and the other or another blow mould immediately on the next completion of an injection moulding.

What is claimed is:

1. In an injection/blow moulding machine having a plurality of blow moulds served by an injection mould, the transfer mechanism comprising:

(a) bearing means comprising a plurality ($n-1$) of parison stick transporting members where $n=$ the number of moulds, each having means for connecting the member to and disconnecting the member from a parison stick;

(b) carriage means carrying said bearing means;

(c) support structure for supporting said carriage means so that in respect of the injection mould and a pair of blow moulds served by the injection mould, the carriage means can be passed between (i) a first station in which a first parison stick transporting member is positioned to be connected with and to be disconnected from a parison stick of a blow mould, and further parison stick transporting member is positioned to be connected with and to be disconnected from a parison stick of the injection mould, and (ii) a second station in which the first parison stick transporting member is positioned to be connected to and to be disconnected from the parison stick of the injection mould, and the further parison stick transporting member is positioned to be connected to and to be disconnected from a parison stick of the other of said pair of blow moulds; and (d) operating means for effecting a sequence of operations of the transfer mechanism as follows; the assumption being made that the carriage means is at one of said two stations at the start of the sequence:

(1) a connection of the respective parison stick transporting members to the parison sticks respectively of the blow mould concerned and the injection mould, (2) after opening of that blow mould and the injection mould, a simultaneous movement of the parison stick transporting members thus connected to the parison sticks, to transport the parison stick of said blow mould concerned to the injection mould and to transport the parison stick of the injection mould to that blow mould, and position the two sticks concerned in the position they are to occupy when the respective moulds are closed, (3) after closing of the said blow mould and the injection mould, a disconnection of the two transporting members from the respective parison sticks, and (4) passage of the carriage means to the other of said two stations so that the transfer mechanism is left ready to undertake a further transfer.

2. A machine as claimed in claim 1, in which the bearing means comprise a depending rotatable arm bearing at the lower extremity thereof a beam providing two identical, opposed limbs each of which comprises means for connecting the limb with and disconnecting the limb from a parison stick whereby each limb constitutes a parison stick transporting member, and wherein the operating means comprise means for lowering, raising and rotating the arm whereby in said sequence of operations, a transfer of parison sticks between a blow mould and the injection mould is effected by a sequence of movements as follows:

(a) a lowering of the arm to connect the limbs of said beam to respectively a parison stick of the blow mould concerned and a parison stick of the injection mould, (b) after opening of the injection mould and said blow mould concerned, a raising of the arm to take the parison sticks thus connected to the limbs clear of the moulds, (c) a rotation of the arm, through 180° so that the parison stick from said blow mould concerned is positioned above the injection mould and the parison stick from the injection mould is positioned above the blow mould, and (d) a descent of the arm to position the parison sticks connected to said limbs, in the blow mould concerned and the injection mould respectively.

3. A machine as claimed in claim 2, in which said arm is a telescopic arm whereby the raising movement is effected by a contraction of the arm and the lowering movement is effected by an expansion of the arm.

4. A machine as claimed in claim 3, in which there are provided three moulds set in alignment, the moulds consisting of two blow moulds and an injection mould located equidistant from and between the two blow moulds.

5. A machine as claimed in claim 4 in which the moulds are two-part moulds of the type in which one part is fixed and the other part is a movable part; in which said support structure comprises a bridge providing a span overlying the moulds and said carriage means comprises:

(1) a main carriage mounted on the span of said bridge for movement to and fro thereon so that the main carriage can be moved to assume either of said two stations, and (2) a subsidiary carriage mounted on said main carriage for movement to and fro on the main carriage in a direction transverse to the direction of movement of the main carriage; and in which said operating means comprise means for effecting a movement of the subsidary carriage when the main carriage is at either of said two stations so that when the moulds whose parison sticks are connected to parison stick transporting members, are opened, the parison sticks are first drawn away from the respective fixed parts of the moulds to enable the parison sticks to be withdrawn from between the respective mould parts and so that when the parison sticks are placed between the respective mould parts in a transfer operation, the parison sticks are moved towards the respective fixed parts of the moulds to assume the position they are to occupy when the respective moulds are closed.

6. A machine as claimed in claim 5 in which said operating means comprise an arrangement of fluid-pressure piston and cylinder devices and valves such that in said sequence of operations each operation on termination thereof initiates the following operation of the sequence.

7. A machine as claimed in claim 6, in which the valves are operated by cam-operated electrical limit switches and cam strikers located respectively on relatively moving parts of the transfer mechanism.

8. An injection/blow moulding machine as claimed in claim 1, wherein said support structure comprises tracks underlying the moulds of the machine so that in transfers of parison sticks between the injection mould and either of the pair of blow moulds, vertical movement of the parison sticks to clear the moulds is avoided.

9. In an injection/blow moulding machine having a plurality of blow moulds served by an injection mould, the transfer mechanism comprising:

(a) for each of a blow mould and the injection mould a parison-stick transporting member having means for connecting the member with and disconnecting the member from a parison-stick, (b) carriage means for the parison-stick transporting members, (c) support structure for supporting the carriage means of the parison-stick transporting member so that by a movement of the carriage means on the support structure, a parison-stick transporting member can be passed between a first position in which it is positioned to be connected with and disconnected from a parison-stick of the injection mould and a second position in which it is positioned to be connected with and disconnected from a parison-stick of the blow mould concerned, and (d) operating means for effecting a transfer of one of the parison-stick transporting members from the injection mould to the blow mould concerned and of the other of the parison-stick transporting members from the blow mould concerned to the injection mould by a simultaneous operation first to connect each parison stick transporting member with a parison stick of the respective mould, then to transfer the two members and then to disconnect them from their respective parison-sticks so that the transfer mechanism is left free to undertake a further transfer.

References Cited

UNITED STATES PATENTS

| Re. 26,265 | 9/1967 | Farkas | 18—5BI |
|---|---|---|---|
| 2,298,716 | 10/1942 | Moreland et al. | 18—5BIUX |
| 2,914,799 | 12/1959 | Canfield | 18—5BI |
| 3,264,684 | 8/1966 | Moslo | 18—5BI |
| 3,337,667 | 8/1967 | Niinneman | 264—97 |
| 3,357,045 | 12/1967 | Ninneman | 18—5BI |
| 3,364,520 | 1/1968 | Hestehave | 18—5BI |

CHARLES W. LANHAM, Primary Examiner

M. O. SUTTON, Assistant Examiner

U.S. Cl. X.R.

264—97